(12) United States Patent
Kraft et al.

(10) Patent No.: US 11,168,456 B2
(45) Date of Patent: *Nov. 9, 2021

(54) SYSTEMS, METHODS, AND MACHINES FOR AUTOMATED SCREW ANCHOR DRIVING

(71) Applicant: Ojjo, Inc., San Rafael, CA (US)

(72) Inventors: Steven Kraft, Albany, CA (US); Jack West, San Rafael, CA (US); Daniel Flanigan, Petaluma, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,523

(22) Filed: Nov. 6, 2020

(65) Prior Publication Data

US 2021/0140134 A1 May 13, 2021

Related U.S. Application Data

(60) Provisional application No. 62/932,929, filed on Nov. 8, 2019.

(51) Int. Cl.
*E02D 7/22* (2006.01)
*E02D 5/56* (2006.01)
*E02D 33/00* (2006.01)
*H02S 20/10* (2014.01)

(52) U.S. Cl.
CPC ............... *E02D 7/22* (2013.01); *E02D 5/56* (2013.01); *E02D 33/00* (2013.01); *E02D 2600/10* (2013.01); *H02S 20/10* (2014.12)

(58) Field of Classification Search
CPC .. E02D 7/22; E02D 5/56; E02D 33/00; E02D 2600/10; H02S 20/10
See application file for complete search history.

(56) References Cited

U.S. PATENT DOCUMENTS

| 4,131,166 A | 12/1978 | Schnell |
| 5,762,148 A | 6/1998 | Kattentidt et al. |
| 9,624,638 B2 | 4/2017 | Freyssinet |

FOREIGN PATENT DOCUMENTS

KR 101811921 B1 12/2017

OTHER PUBLICATIONS

International Search Report for PCT/US2020/059478 dated Feb. 26, 2021.

*Primary Examiner* — Tara Mayo-Pinnock
(74) *Attorney, Agent, or Firm* — Philip Mancini

(57) ABSTRACT

In a machine for driving screw anchors and other foundation components, a desired embedment depth is calculated based on a minimum required embedment depth, work point height and length of available upper leg sections. Once calculated, the machine automatically drives the screw anchor to the depth so that one of the available upper leg lengths will fit between the driven screw anchor and apex truss hardware. If uplift is detected during driving, the machine will add additional embedment depth. In-situ validation of driven screw anchors may be performed after the embedment depth is reached.

7 Claims, 11 Drawing Sheets

SYSTEMS, METHODS, AND MACHINES FOR AUTOMATED SCREW ANCHOR DRIVING

CROSS-REFERENCE TO RELATED APPLICATIONS

This claims priority to U.S. provisional patent application No. 62/932,929 filed on Nov. 8, 2019, titled "SYSTEMS AND METHODS FOR DRIVING SCREW ANCHORS TO DESIRED EMBEDMENT DEPTH", the disclosure of which is hereby incorporated by reference in its entirety.

BACKGROUND

As the price of solar has dropped relative to fossil fuel-based energy sources, so-called utility-scale solar arrays are being developed all over the United States and around the world. Utility-scale arrays may span a few megawatts of capacity up to hundreds of megawatts and even gigawatts. Originally, these arrays were arranged as fixed tilt ground-mounted arrays, however, as solar panel prices have dropped, single-axis solar trackers are becoming the preferred utility-scale form factor. Single-axis trackers are configured as North-South oriented rows of solar panels attached to a rotating torque tube. The torque tube is moved by a motor or other drive mechanism that slowly rotates multiple panels at once, so they move from East-facing to West-facing to follow the sun's daily movement through the sky.

Most single-axis tracker makers manufacture and sell only the tracker components such as torque tubes, bearings, dampers, drive assemblies, purlins, module brackets, etc., but few provide the foundation, that is, the ground-anchored components that physically support and mechanically interface with the tracker. Instead, they design their systems to attach to standard galvanized steel beams known as H-piles. These beams come in standard sizes like W6×9 and W6×12, among others, and provide uniform web and flange interface so that different tracker companies' systems can be supported with essentially the same foundation.

H-pile solar foundations are typically installed using a pile driver, a percussive or vibratory tool that holds the pile at a plumb orientation and beats or vibrates the head of it repeatedly to incrementally drive it into the ground. Although the pile driver is a piece of standard equipment, given their prevalence in the commercial solar industry, and the relatively small pile sizes used to support solar trackers, certain equipment makers have begun manufacturing pile driving machines specifically for the utility-scale solar industry.

The Applicant of this disclosure has developed a novel truss-based foundation system to replace H-piles as the preferred foundation for single-axis trackers and other projects. Known commercially as EARTH TRUSS, this system is formed with a pair of screw anchors, above-ground upper legs and an adapter or truss cap that joins the free ends of the upper legs to complete the A-frame shaped assembly. The screw anchors are driven into the ground adjacent one another and at opposing angles in a common East-West plane to straddle an intended North-South line of the tracker row. They are open at both ends, enabling a mandrel, drill, or other tool to be extended through them while they are being driven. The truss cap is held in place by a jig on the machine and upper legs are sleeved over connectors on either side of the truss cap and at the upper end of each screw anchor. One or more crimpers are used to crimp the upper legs around the connectors preserving the truss cap's position.

To do this quickly and efficiently on the scale required for large, commercial solar projects requires the development of a machine, and systems and methods for automated control of such a machine. Even if screw anchors on a given project site are all the same length, variations in terrain, soil consistency, and other factors may require different embedment depths for each anchor or pair of anchors in a given row. Also, because trusses are constructed from multiple components, embedment depth may need to be adjusted to account for available upper leg lengths and to accommodate the fixed truss work point height, that is the apex height of the truss. A long tracker row may extend over three hundred feet and require dozens of truss foundations. It is therefore important that each truss is positioned to hold the torque tube so that it extends along this distance on a substantially straight axis.

In order to address these issues, there is a need for a new and improved screw anchor driving machine, as well as systems and methods for controlling it, to be able to calculate the correct embedment depth automatically at each foundation location and to select an ideal upper leg length from the available lengths to insure that the screw anchor and upper leg will orients the truss cap at the correct position.

DETAILED DESCRIPTION

Figure 1A:
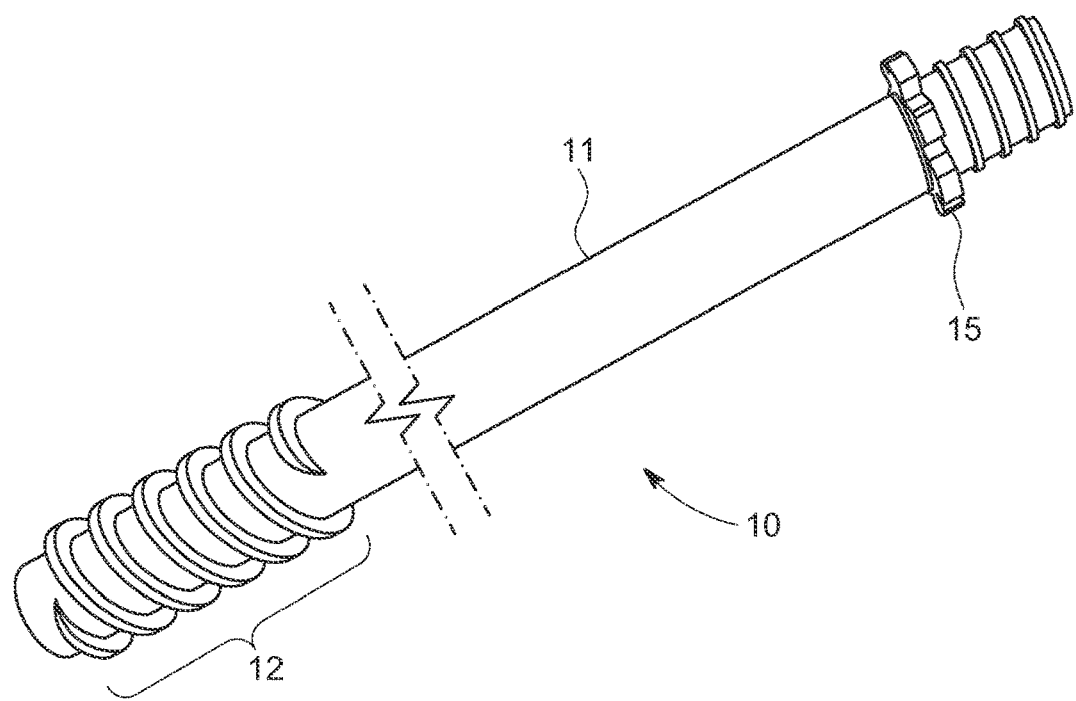
FIG. 1A shows an exemplary screw anchor usable with various embodiments of the invention.

The invention will now be described in the context of the drawing figures where like elements are referred to with like designations. This description is intended to convey a thorough understanding of the embodiments described by providing a number of specific embodiments and details involving automated methods, machines, and systems for driving foundation components for single-axis trackers, and in particular screw anchors. It should be appreciated, however, that the present invention is not limited to these specific embodiments and details, which are exemplary only. Although the various embodiments of the invention may be especially useful for controlling and improving a driving process for screw anchors for single-axis trackers and other solar arrays, they may also be useful for controlling and improving the driving process for foundation components for numerous other structures. It should be further understood that one possessing ordinary skill in the art in light of known systems and methods, would appreciate the use of the invention for its intended purposes and benefits in any number of alternative embodiments, depending upon specific design and other needs.

Figure 1B:
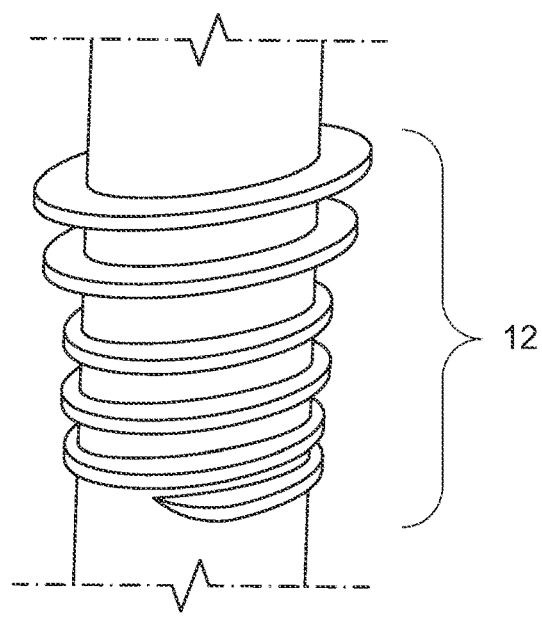
FIG. 1B is a detail view of a lead-in thread form of a screw anchor usable with various embodiments of the invention.

FIG. 1A shows an exemplary screw anchor 10 usable with various embodiments of the invention. Screw anchor 10 consists of a hollow, substantially uniform diameter rounded shaft 11 that is open at both ends with external threads 12 at one end and a driving collar 15 at the other. In various embodiments, threads 12 may have a tapered profile, as seen for example, in FIG. 1B, so that their outside diameter increases moving up the shaft to create a lead-in. A taper such as this may help keep it on path while driving and also assist when driving into hard soils, caliche and even rock. The threads may also, in various embodiments, be tilted slightly upwards, that is, towards collar 15 to provide additional resistance to pull out. The length of screw anchor 10 may be variable depending on the desired depth of embedment (e.g., 1-2 meters). In the context of foundations for single-axis trackers and other axial solar arrays, embedment depth may be dictated by soil type, grade of land, torque tube height, and tracker type, among other factors. The inside diameter of the shaft may be between two and half and three inches and the thickness on the order of a few millimeters. It may be formed from galvanized alloy steel or other suitable material. In some cases, it may be coated with one or more additional anti-corrosion coatings such as fusion bonded epoxy, polyurethane, or acrylic, among others. Driving collar 15 may be a separate cast structure welded on to the upper end of shaft 11 or, alternatively, may be stamped, pressed, or otherwise formed in the upper end. Threads 12 may be welded to the outside of shaft 11 at the lower end, may be attached with bent tabs or, in some cases may even be stamped into the lower end. The threads enable screw anchor 10 be driven into supporting ground with a combination of torque and downforce. Screw anchor 10's open end allows a drill or other tool to be extended through it while the anchor is being driven into the ground to enable it to go through dense soil, rocks or other strata that might refuse the anchor by itself.

Figure 2:
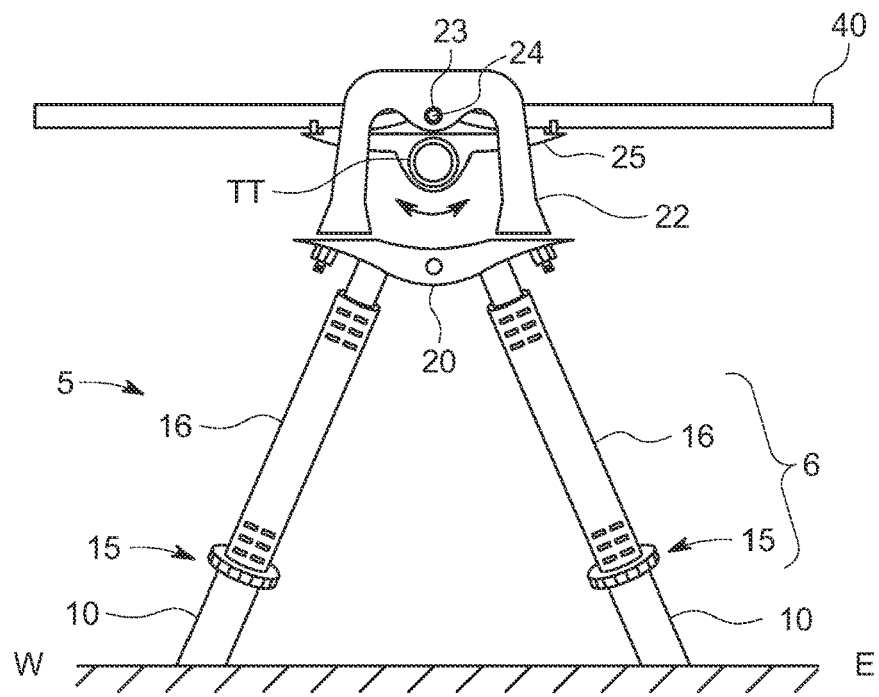
FIG. 2 is a front view of a portion of a single-axis tracker supported by truss foundation in accordance with various embodiments of the invention.
Figure 3:
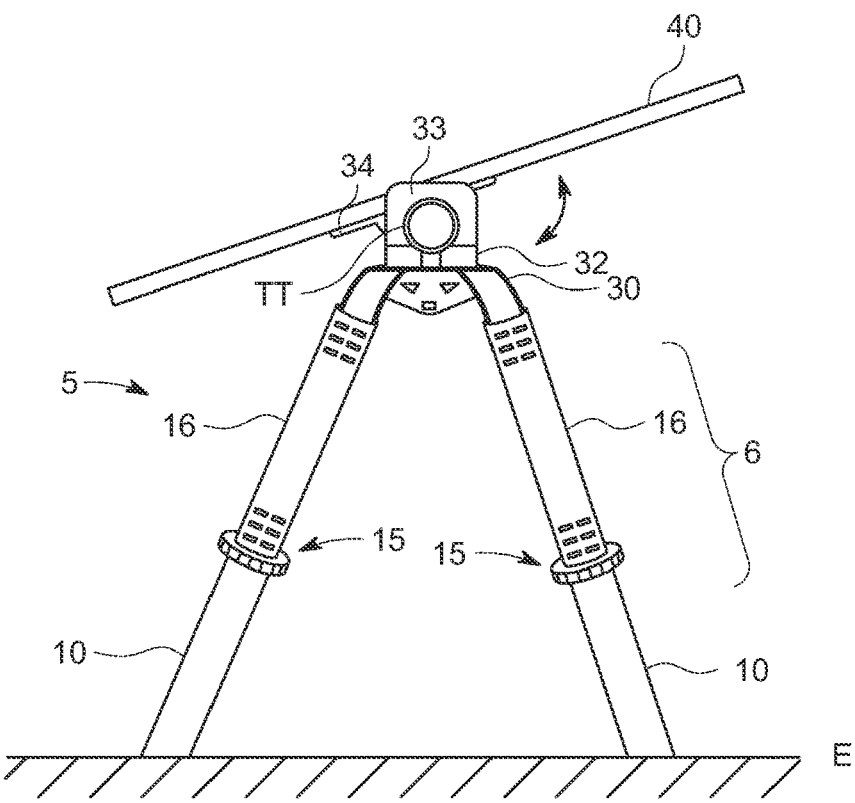
FIG. 3 is a front view of a portion of another single-axis tracker supported by a truss foundation in accordance with various embodiments of the invention.

The Applicant of this disclosure has proposed a new foundation system for axial solar arrays designed to replace H-piles. The foundation system relies on a pair of adjacent truss legs joined together above ground by a truss cap, adapter, bearing adapter or other structure to form a rigid A-frame-shaped structure. The angled legs translate lateral wind loads into axial forces of tension and compression rather than bending, allowing less steel to be used relative to H-piles. Variants of this foundation system, known commercially as EARTH TRUSS, that are particularly well-suited for supporting single-axis trackers are shown in FIGS. 2 and 3. FIG. 2 shows the system supporting a mechanically balanced single-axis tracker such as the NX Series of single-axis trackers manufactured and sold by NEXTracker Inc., of Fremont, Calif. FIG. 3 shows the system supporting a conventional generic single-axis tracker.

In each case, EARTH TRUSS system 5 consists of a pair of adjacent screw anchors 10 that have been driven into supporting ground at angles to one another on the East and West sides of an intended North-South line of a tracker row. Once anchors 10 reach their target embedment depth, driving stops and truss cap or adapter 20/30 is held in place by a jig on the driving machine at the correct location to insure alignment with other truss caps or adapters in the same row. Then, upper legs 16 are sleeved over driving collars 15 of each anchor and respective connecting portions 21 of the truss cap to complete each truss leg 6. Starting with the example of FIG. 2, truss cap 20 provides a pair of spaced-apart pedestals that support the opposing feet of NEXTracker bearing housing assembly (BHA) 22. As shown, BHA 22 is a cardioid-shaped hoop with bearing 23 proximate to the cusp. It should be appreciated that other variants are possible as long as the bearing location enables the torque tube to be suspended from a bearing pin rather than rotating about its own axis. Bearing pin 24 is received within bearing 23 and extends out of both sides of BHA 22. A torque tube module bracket such as bracket 25 is suspended from either side of bearing pin 24. Brackets 25 support the torque tube (labeled "TT") and also attach to the frame of at least one adjacent photovoltaic module or solar panel 40. In this type of tracker system, the drive motor's drive axis is aligned with bearing pin 24 rather than the torque tube so that as the motor's output shaft rotates, the torque tube swings through an arc that is bounded on either side by the BHA 22. This accomplished by a bend in the torque on both sides of the drive motor.

By contrast, FIG. 3 shows truss foundation 5 supporting a conventional single-axis tracker in which the torque tube rotates about its own axis. Truss cap 30 joins free ends of upper legs 16 to form a single pedestal that supports conventional bearing assembly 32. Though the torque tube is shown having a rounded cross section, it should be appreciated that in some cases, the tube may be faceted for increased strength with a bearing insert located between the outside of the torque tube and inside of bearing 33. Bearing 33 allows the torque tube to rotate about its own axis rather than swinging through an arc. The drive motor or row-to-row drive assembly imparts torque directly to the torque tube to adjust the orientation of modules 40. Module brackets such as bracket 34 rely on U-bolts or other common fasteners to attach the modules to the torque tube.

As shown in the figures, upper legs 16 are joined to adapters 20/30 by sleeving the open end of each leg over respective connecting portions protecting away from the adapter. Then, crimps are formed over the overlapping portion of each upper leg 16 to lock the adapters into place. Crimps are also formed at the lower end of each upper leg 16 where it overlaps with the collar 15. In various embodiments, the screw anchor driving machine may include a jig or other device that orients the adapter or truss cap so that it is level and aligned with a laser line to be at the at the same Y (East-West) and Z (up-down) position as every other adapter in the current row so that the EARTH TRUSS can be constructed in a fast, precise and repeatable manner. In various embodiments, once the adapter or truss cap 20/30 has been properly aligned, upper legs 16 may be crimped at each end, that is, at the areas of overlap with screw anchors 10 and with truss cap or adapter 20/30, thereby forming a rigid A-frame structure. In various embodiments, assembling the EARTH TRUSS at the time the screw anchors are driven will obviate the need for later alignment steps, such as when the tracker components are installed.

Figure 4A:
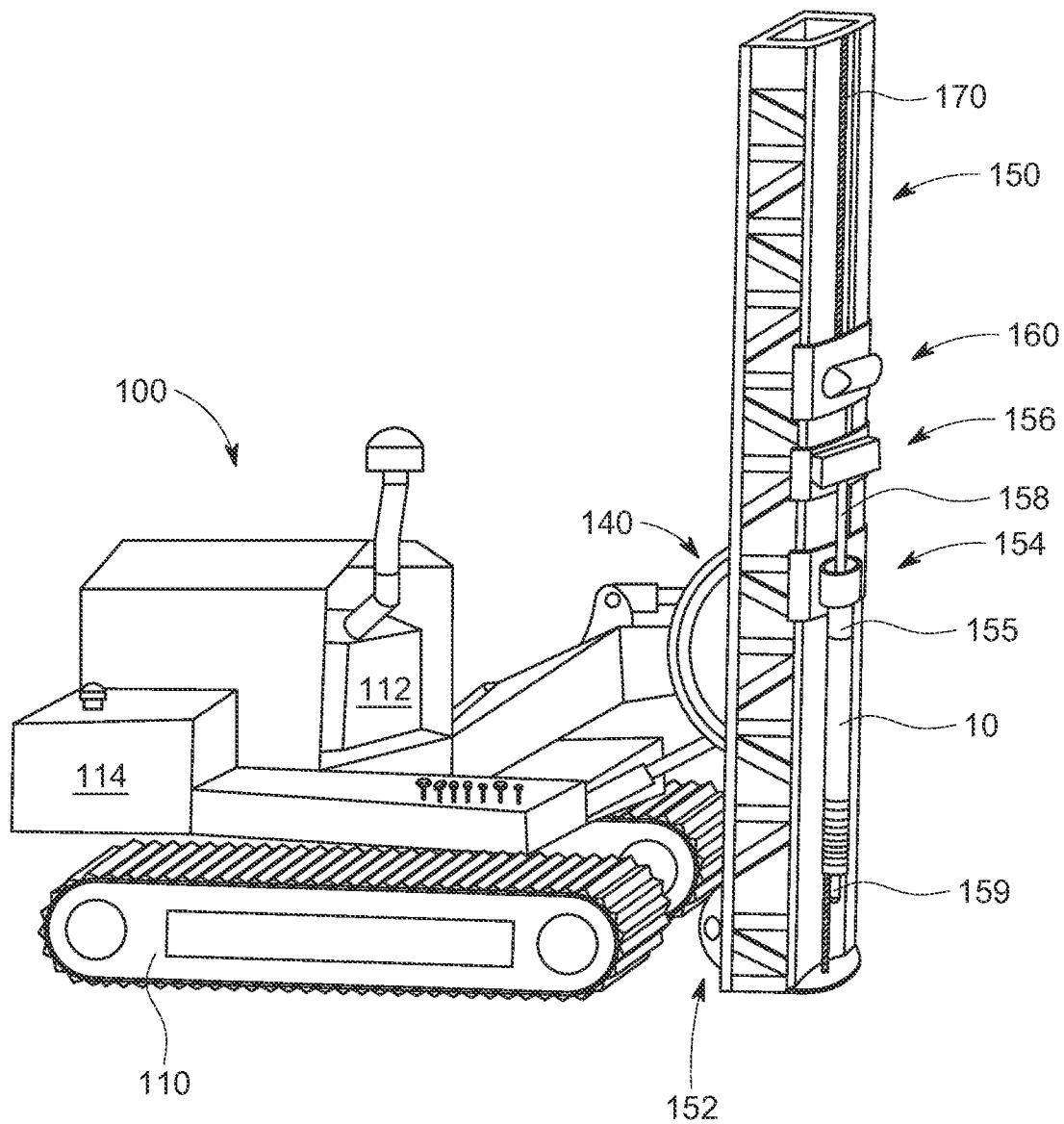
FIG. 4A is a perspective view of screw anchor driving machine according to various embodiments of the invention.

Turning to FIG. 4A, this figure shows a screw anchor driving machine 100 manufactured by the applicant of this disclosure and known commercially as the truss driver in accordance with various exemplary embodiments of the invention. The truss driver is used to drive adjacent screw anchor pairs along the tracker row and to support the adapter, bearing adapter or other apex hardware while the EARTH TRUSS is constructed. As shown, machine 100 is built on tracked chassis 110 with engine 112 and a hydraulic drive system. It should be appreciated that future versions of the machine may be electrically powered. Such modifications are within the spirit and scope of the invention. Also, it should be appreciated that machine 100 could instead ride on tires, on a combination of tires and tracks, on a floating barge, on rails or on another movable platform.

At one end, machine 100 supports articulating mast 150 that in turn supports the elements used to drive screw anchors and assemble truss foundations. In the figure, mast 150 is shown as an elongated boxed ladder-like structure extending approximately 15-25 feet in the long direction. It is connected to machine 100 by one or more hydraulic actuators. In various embodiments, rotator 140 enables articulating mast 150 to move through an arc in at least one plane extending from the front to the back of the machine that spans approximately 90-degrees to allow mast 150 to go from a stowed position where the mast is substantially parallel to the machine's tracks, to an in-use position where the mast is substantially perpendicular to them. Therefore, when mast 150 is in the stowed position, its height is minimized, whereas when mast 150 is in-use, it will extend far above machine 100. In various embodiments, rotator 140 is positioned in front of the one or more actuators connecting mast 150 to machine 100 so that the mast can rotate through a range of angles about a point of rotation (e.g., plus or minus 35-degrees from plumb) so that screw anchors may be driven into the ground at a range of angles while the machine remains stationary. This also decouples the driving angle from the left to right slope of the ground under the machine, allowing it to compensate for uneven terrain.

In various embodiments, in addition to rotating in plane, articulating mast 150 may move with respect to machine 100 so that it can self-level, adjust its pitch, and yaw, and move in the X, Y and Z-directions (where X is North-South, Y is East-West, and Z is vertical) without moving the machine. This may be accomplished with additional actuators or slides that move an intermediate frame that supports rotator 140 and that is positioned between the rotator and the machine. The components of machine 100 used to drive screw anchors are mounted on and move with the mast, as opposed to those used to position the mast. Parallel tracks 151 extending substantially the entire length of the mast define the plane that those components move in. Alternatively, the mast components may travel on wheels retained on a track running along the mast. Therefore, the mast's orientation dictates the vector or driving axis that screw anchors are driven along.

Figure 4B:
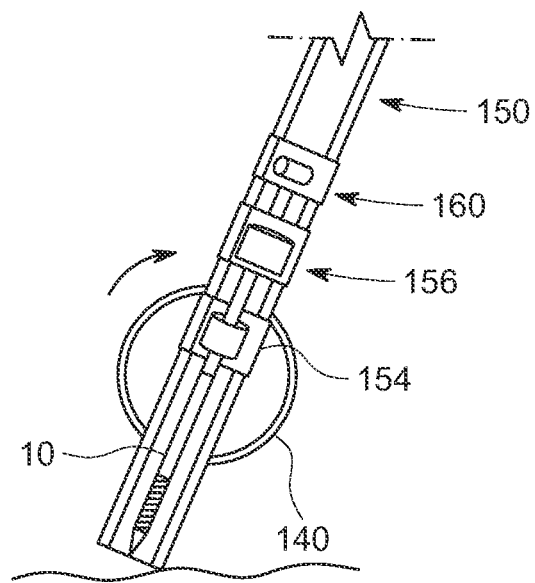
FIG. 4B is a partial front view of a mast of a screw anchor driving machine according to various embodiments of the invention.
Figure 4C:
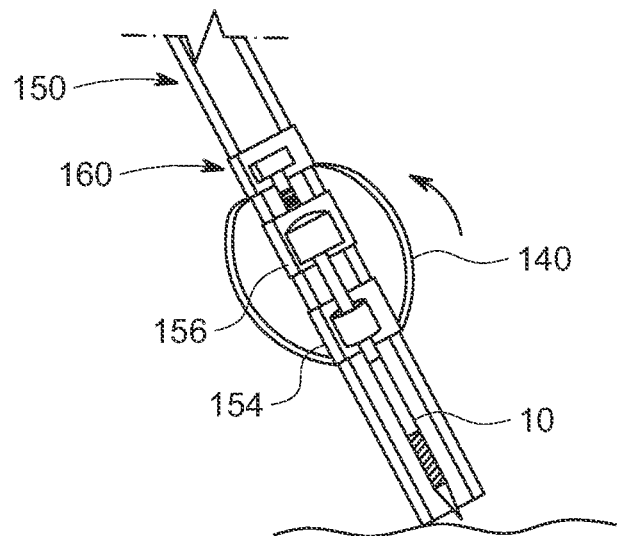
FIG. 4C is another partial front view of a mast of a screw anchor driving machine according to various embodiments of the invention.

As shown, the mast components include screw or rotary driver 154 with chuck 155 that connects to driving collar 15 of the screw anchor, and tool driver 156, located above the rotary driver. In various embodiments, rotary driver 154 may be powered by hydraulics or by electric current. Similarly, tool driver 156 may be powered by hydraulics, compressed air, electric current, or combinations of these. In various embodiments, tool driver 156 is a hydraulic drifter that drives a tool consisting of shaft 158 and bit or tip 159 that extends along mast 150, passing through rotary driver 154, chuck 155 and the center of screw anchor 10. In various embodiments, and as shown in the figures, rotary driver 154 and tool driver 156 may be oriented concentrically on mast 150 in the direction of tracks 151 so that shaft 158 can pass through rotary driver 154 while it is driving a screw anchor. In this manner, the tool tip 159 may operate ahead of the screw anchor, projecting out of its open, lower end. In various embodiments, driver 154 is loaded by sleeving a screw anchor over tip 159 and shaft 158 until it reaches chuck 155. Alternatively, tool driver 156 may be withdrawn up mast 150 until shaft 158 and tip 159 are substantially out of the way. Then, mast 150 can be moved to the desired driving vector. In some embodiments, this may comprise aligning the mast and then rotating it in the aligned plane. In other embodiments, the entire mast may be moved so that the point of rotation is oriented somewhere along the driving axis. This will insure that the driven screw anchor points at the desired work point. In various embodiments, an operator may then adjust a slide control for the mast to lower the mast foot 161 to the point where at least a portion of it reaches the ground. Then, the operator initiates an automated drive operation, that as discussed in greater detail herein, if successful, results in the screw anchor being driven to the desired embedment depth. When the operation is complete, tool driver 156 and rotary driver 154 travel back up mast 150 so that another screw anchor may be loaded before moving mast 150 in the opposing direction to drive the adjacent screw anchor so that the pair straddles the intended North-South line of the tracker row and points at a common work point. FIGS. 4B and 4C show mast 150 oriented at different drive angles via the rotator. In various embodiments, the rotator may be used to control the angle while mast adjustment components are used to orient the mast in the correct plane.

Figure 5:
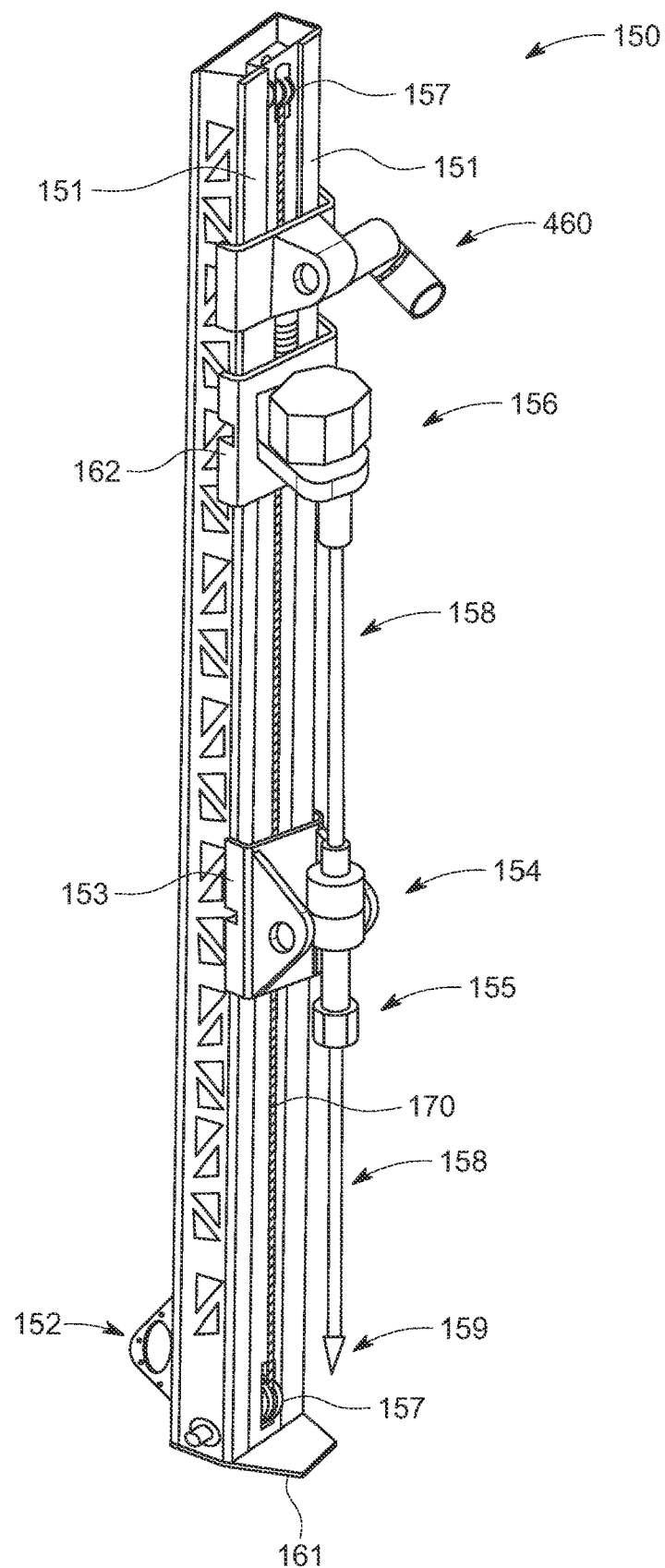
FIG. 5 is an isolation view of a mast of a screw anchor driving machine according to various embodiments of the invention.

FIG. 5 shows mast 150 of machine 100 in greater detail. Mast 150 is formed from multiple elongated sections of steel welded together to form a structure with a generally box-shaped cross-section. Planar portions on opposing side edges of the outer face form tracks 151 running substantially the entire length of mast 150. In this exemplary system, lower crowd motor 152 is mounted near the base of mast 150 on the back side. In various embodiments, lower crowd motor 152 powers a drive train, such as a heavy-duty single or multi-link chain 170 that runs substantially the entire length of mast 150 between a pair of chain tensioners 157 positioned at the top and bottom ends of mast 150. Lower carriage or crowder 153 is mounted on tracks 151 and is connected to drive train 170 so that when lower crowd motor 152 pulls down on chain 170, carriage 153 causes rotary driver 154 to push down on the head of the attached screw anchor with the same force. As shown, rotary driver 154 is attached to lower carriage 153 so that the two move together. Rotary driver 154 includes chuck 155 on its lower portion that receives the head of a screw anchor and imparts torque and downforce to the head to drive it into the underlying ground. Upper carriage 162 is also tracked on mast 150 and attached to drive train 170 driven by lower crowd motor 152. As shown, tool driver 156, in this example, a hydraulic drifter, is attached to upper carriage 162. Hydraulic drifters are often employed in rock drilling machines to provide a selectable combination of rotation and hammering depending on the type of bit used. Herein, the word "tip" in reference to element 159 is used generically to refer to the tool attached to the end of shaft 158 controlled by tool driver 156 and may be a drill bit (button, drag, cross, tri-cone, etc.), a pointed mandrel tip, or other suitable tool. As shown, tip 159 is controlled by tool driver 156 via a shaft 158 connected to the output of tool driver 156 and extending lengthwise down mast 150, through an opening in rotary driver 154 and out through chuck 155. With this configuration, tool driver 156 may impart torque and hammering force to tip 159 through rotary driver 154 and attached screw anchor 10 while rotary driver 154 is driving the screw anchor.

In various embodiments, tip 159 is maintained slightly ahead of the threaded end of screw anchor 10 to assist with embedment. In some cases, during a screw driving operation, lower crowd motor 152 may pull down on carriage 153 and carriage 162, causing both rotary driver 154 and tool driver 156 to travel down mast 150 at the same rate with tip 159 projecting out of the open, lower threaded end of screw anchor 10. In other cases, as discussed in greater detail below, it may be desirable for tool driver 156 to travel independent of rotary driver 154. To that end, upper crowd motor or drifter motor 160 also rides on the drive train but may selectively disengage from the drive train to move tool driver 156 can move independently. This enables tool driver 156 to extend tip 159 further past screw anchor 10 as well as to withdraw it without moving screw anchor 10 or rotary driver 154. This functionality may also be used to move upper carriage 162 in the opposite direction while lower carriage 153 moves down or remains in place.

Figure 6:
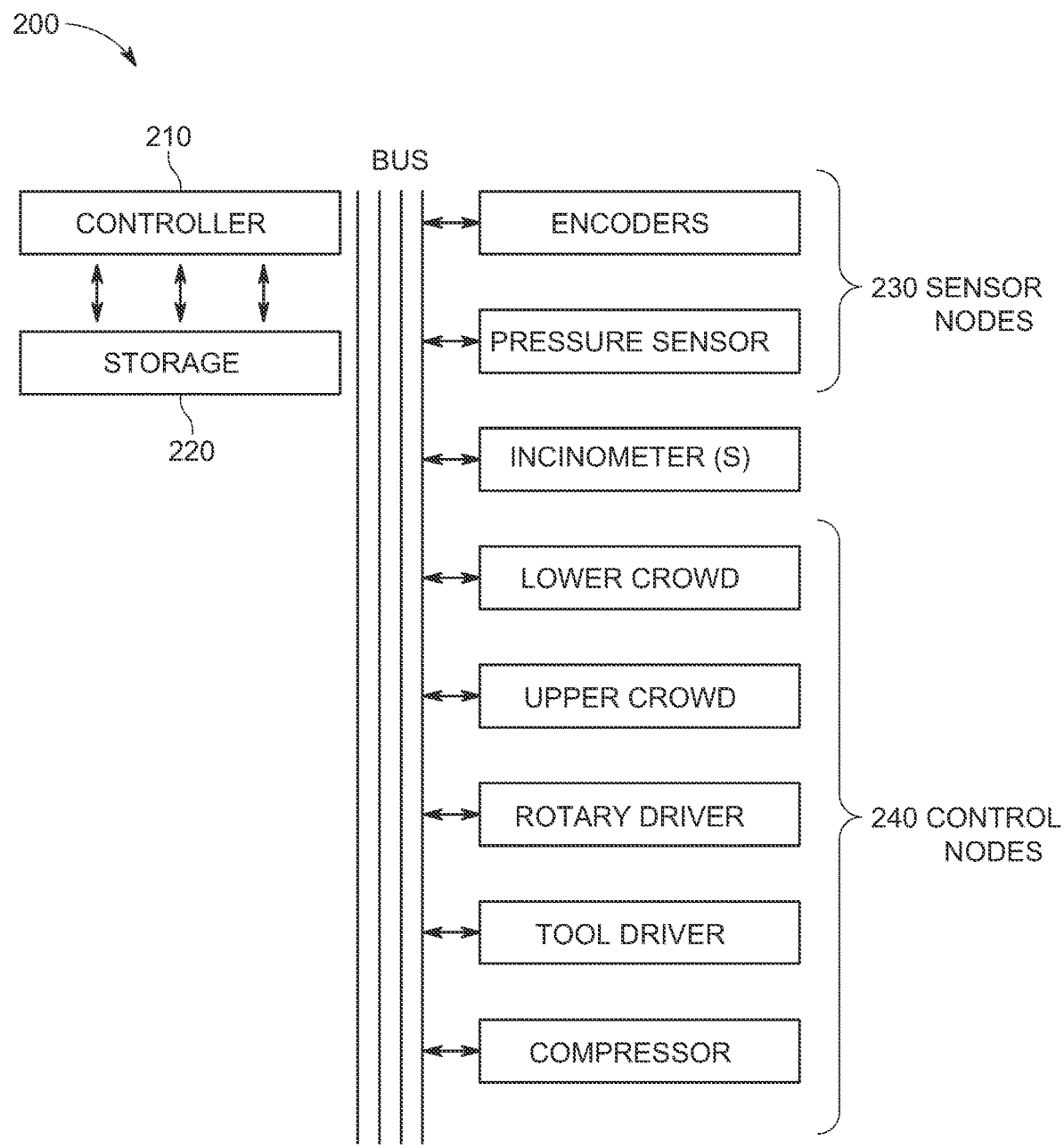
FIG. 6 is an exemplary block circuit diagram of a control circuit for a screw anchor driving machine according various embodiments of the invention.

With the configuration shown in FIG. 5, there are several components that must be individually controlled to effect a driving operation. For example, actuating lower crowd motor 152 will begin to pull lower carriage 153 and in turn rotary driver 154 towards the ground, supplying downforce to screw anchor 10 through the rotary driver 154. At substantially the same time, rotary driver 154 may be actuated to begin applying torque to the head of screw anchor 10. As shown, machine 100 has a series of manual hydraulic controls in a control panel as shown in FIG. 3A. These controls may allow manual control of the machine tracks as well the mast, the rotary driver, tool driver, lower crowd motor, and upper crowd motor. Notwithstanding these manual controls, maximum accuracy and driving throughput may in many cases be possible only by relying on machine automation. To that end, in various embodiments, machine 100 and mast 150 of FIGS. 3A and 4 may include one or more programmable logic controllers (PLCs) or other general or special purpose computers executing a control program that controls the driving functions of machine 100 and mast 150 and that uses real-time sensor data along with stored program code to control the operation of the machine mast, lower crowd motor, rotary driver, tool driver and upper crowd motor to optimize the screw driving operation. FIG. 6 shows one possible configuration of a control circuit that may be used to accomplish this.

The heart of control circuit 200 in FIG. 6 is the PLC labeled controller 210 in the figure. The PLC may be an off-the-shelf black-box control device such as that available from Rockwell Automation or other supplier. Controller 210 may also be a circuit board containing a general-purpose or purpose-built computer programmed to execute a control program for the machine and mast. Controller 210 and other necessary components may be mounted in a box on the machine and controllable via a user interface on the machine and/or via a remote control held or worn by an operator. Controller 210 may execute program code stored in non-volatile memory, labeled storage 220 in the figure. The program code executed by controller 220 may be written in structured text, instruction list or other suitable IEC 61131-3 textual or graphical programming language standard, or other in another suitable programming language. As shown, controller 210 and storage 220 are connected to a communication bus that is used to relay sensor data and control signals between components of circuit 200. The bus may be a wired bus, such as an N-bit communication line, a wireless bus operating on one or more suitable wireless communication protocols (e.g., Wi-Fi, Bluetooth, Zigbee, ZWave, Digi Mesh, 2G-5G, etc.), or combinations of wired and wireless protocols. Multiple sensors are shown on control circuit 200 that provide real-time information to controller 210. In this example, these include encoders (e.g., linear and rotary encoders) used to incrementally count the movement of moving objects with respect to a non-moving reference, pressure sensors for measuring hydraulic pressure, downforce, air pressure, and/or resistance, among other variables. The sensors may also include one or more inclinometers used to facilitate self-leveling adjustment prior to driving, to determine the extent of roll adjustment needed to self-level, and also to monitor changes in level that occur during driving as the mast and machine lift-up in response to driving resistance. Additional sensors such as torque meters, pressure meters, and other may also be used. Controller 210 may also receive real-time state information from lower crowd motor 152, upper crowd motor 160, rotary driver 154, tool driver 156, air compressor (not shown) and/or a hydraulic control system (not shown) including position, pressure, temperature, among other metrics, and may send commands to these components as part of the automated control program for driving screw anchors. This could include output torque, rate of rotation, rate of travel, etc. The direction of the arrows shown in control circuit 200 indicate the direction of information flow. Controllable nodes (e.g., upper crowd, lower crowd, etc.) have two-way arrows while sensors merely transmit information and therefore are typically connected with one-way arrows. It should be appreciated, however, that a two-way connection to sensors may be desirable to enable information to be pulled and for status checks. Though not shown here, a separate power bus may supply power and/or hydraulic pressure to one or more of sensor nodes 230 and control nodes 240.

Storage 220 may also contain information generated during driving operations. In various embodiments, it may be desirable to store acquired information remotely (e.g., in a cloud-based database) because it may be useful to have this information stored with other information about the job site that is not necessary for operation of the driver control system. Therefore, the circuit may store this information temporarily and transfer it to available cloud-storage via the bus when in proximity to a network or via a USB port or SD card. Alternatively, a smartphone application or other external device may be used to initiate transfer of this data. In various embodiments, stored information may include information corresponding to a solar tracker foundation installation job, such as, for example a single-axis tracker, including high level information about a job including job owner, system operator, location, maps/images, the type of system, size of the system, components of the system and job plans (e.g., what size/type foundations to install where). Stored information may also include information generated during driving operations including the specific location where foundation components were driven, sensor data received during the driving operation, control signals send to controllable nodes (e.g., lower crowder, upper crowder, rotary driver, tool driver, etc.).

After the machine has been oriented above the insertion point, calculations must be made to enable the machine to automatically drive a screw anchor to the correct embedment depth. Because the EARTH TRUSS is built from the ground up, the screw anchors must be driven to the correct depth or else the torque tube and bearing will be misaligned with others in the row. Cutting each leg to a custom length is one way to achieve alignment regardless of embedment depth, however, this adds two additional steps at each foundation point. This also requires an additional tool to make the cuts and power and will result in wasted metal at each truss location. A better solution is to have two or more pre-sized legs to choose from and to calculate an embedment depth that satisfies minimum embedment requirements for the site while selected the shortest of the available legs. To that end, in various embodiments of the invention, the controller calculates a leg length and embedment depth for the current screw anchor so that it can be automatically driven to mate with a selected one of available leg lengths that orient the tracker components at the correct height.

Figure 7A:
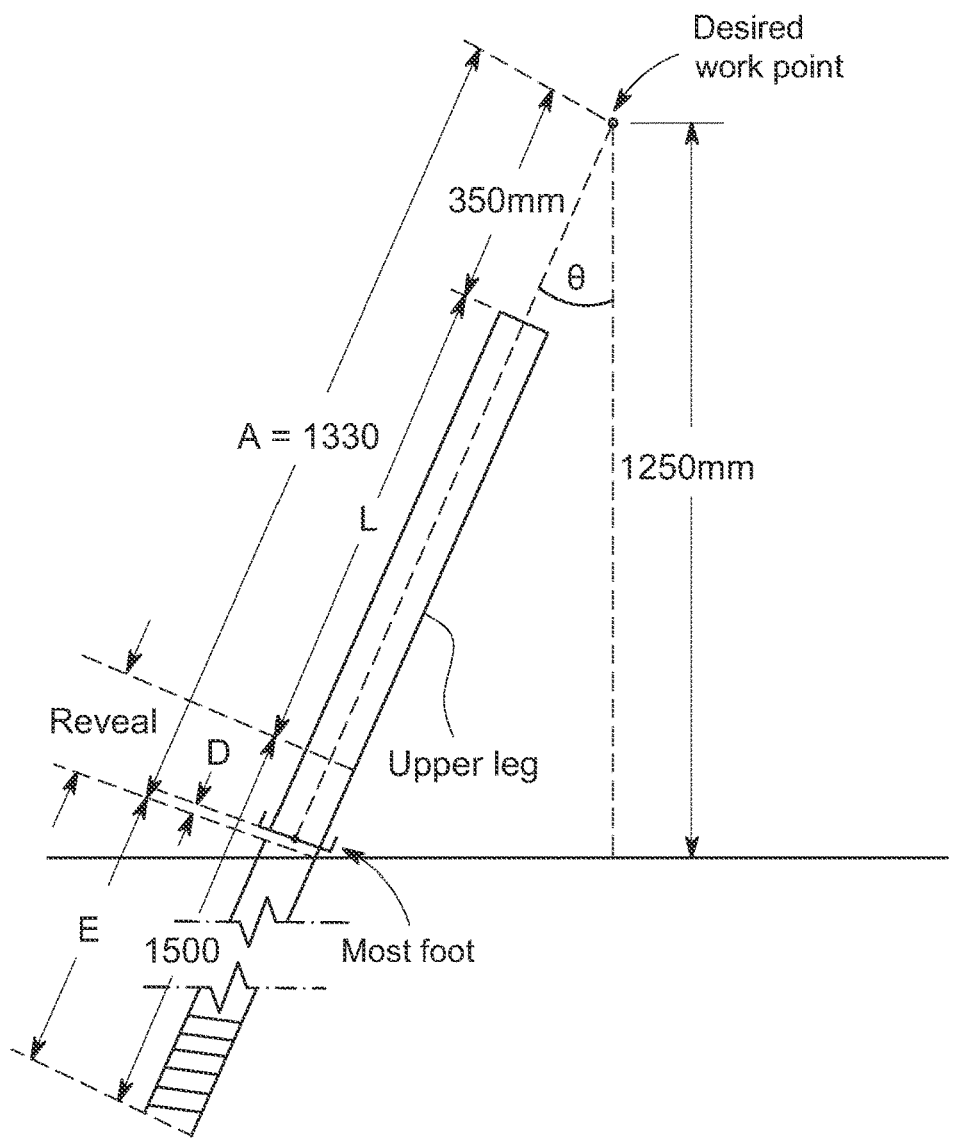
FIG. 7A is a diagram showing the geometry underpinning the automated leg length selection and screw anchor embedment calculation control processes according to various embodiments of the invention.

FIG. 7A illustrates the problem that needs to be solved by the controller to determine the ideal leg length and embedment depth potentially at each foundation point in a tracker array. The image shown in FIG. 7A has been intentionally simplified to show the machine on level ground, however, the same principles will apply when there is East-West slope across the intended tracker row. Also, most details of the mast, other than the mast foot, have been omitted to illustrate the geometry of the problem. Once machine mast alignment has been achieved, that is the machine is oriented above the desired installation point (X-direction) along the row, and it has been aligned in Y, Z, pitch, roll and yaw, so that a screw anchor may be driven along the desired driving axis. In some embodiments, this axis may result in an anchor that is plumb. In others, it may result in an axis that will point orthogonally at the torque tube or axis of rotation. Once alignment is complete, the controller can begin the required embedment depth and leg length calculations. The specific details of alignment have been intentionally omitted here and are the subject of one or more other disclosures.

In various embodiments, the controller is pre-programmed to "know" certain information including the intended work point of the truss foundation, the desired leg angle, the length of the screw anchor, the minimum embedment depth for the job site $E_{MIN}$, any pitch offset from true zero, the length of available pre-cut legs, and the dimensions of the mast and mast components relative to the rotator and the mast foot. With this information, the controller can select the correct upper leg from those available, the resultant embedment depth, and can control the mast and machine to automatically drive the screw anchor to reach the resultant embedment depth.

In order to give the controller a fixed reference point an operator manually controls the mast slide to extend the foot of the mast down to the point where it contacts the ground. The position of the mast relative to a known reference will inform the minimum embedment depth. In other works, a job site may have a minimum embedment depth to achieve the requisite resistance to pull out, however, that distance cannot be assumed to be fixed relative to the work point because there may be swales and peaks across the array site that require the mast to be extended further or less distance to reach the ground. Therefore, the minimum embedment depth is adjusted after the mast is slid down to contact the ground. In various embodiments, the controller will orient the mast correctly in multiple directions of freedom prior to this so that the operator is simply causing the mast foot to extend down along the previously determined axis of orientation, preserving the calculated driving axis. In various embodiments, the mast foot will remain at this position while the screw anchor is driven, serving as a base to stabilize the machine. The angle between the corner of the foot touching the ground and the ground itself, labeled $\beta$ in FIG. 7B, will of course vary based on the East to West slope of the underlying ground. The distance between the center of the drive vector or axis (e.g., center of the foot) and the point of embedment may be easily calculated by multiplying the one half the width of the foot by the tangent $\beta$. On even ground, this will simply be the leg angle which, in this example, is 20-degrees. If, however, there is a 10-degree offset due to the ground sloping down from East to West, $\beta$ will be 30-degrees, or 20-degrees plus the 10-degree offset. By contrast, if the ground slopes in the opposite direction, $\beta$ will be 20-degrees minus the 10-degree offset.

Depending on the tolerance of the mast and machine with respect to embedment depth, it may be desirable to add that tolerance to the minimum embedment depth. For example, if the machine is accurate along the driving axis to within ±25 mm, then it may be desirable to add 25 mm to the minimum embedment depth to insure that if the drive operation falls short by the maximum tolerance, the minimum depth is still achieved.

The leg length calculation involves at least two-steps: first determining a theoretical or minimum leg length based on the minimum embedment depth $E_{MIN}$ calculated in the previous step, and then rounding that length up to match the next closest length of actual available legs. The length of the chosen leg is fed back into the embedment depth calculation to derive an actual embedment depth. In the example of FIG. 7A, the following assumptions are made: $\Theta$=20-degrees, screw anchor length=1500 mm, the desired work point=1250 mm, the fixed distance from the center of the mast rotator and, in this case, the work point, is 350 mm, and the minimum embedment depth $E_{MIN}$=1050 mm. The available leg lengths in this example are 550 mm, 600 mm, and 650 mm. Every inch is equivalent to approximately 25 mm, so the leg lengths vary in approximately two-inch increments. The initial calculation to determine the theoretical leg length subtracts the fixed distance of 350 mm and the screw anchor's reveal distance of 450 mm (based on assumed $E_{MIN}$ of 1050 mm) from the total length A of 1330 mm, derived from the work point height of 1250 divided by the Cosine ($\Theta$). This yields a theoretical leg length of 530 mm. In this example, the available leg lengths are 550 mm, 600 mm, and 650 mm, so 550 mm is chosen as the actual leg length. Using this length, the actual embedment depth is calculated by subtracting the offset of 350, the leg length of 550 from 1330 to get the reveal length of 430 mm. Taking this from the assumed leg length of 1500 mm yields 1070 mm of embedment depth. The controller then operates the machine to achieve this depth by monitoring the movement of rotary driver along the mast.

Figure 7B:
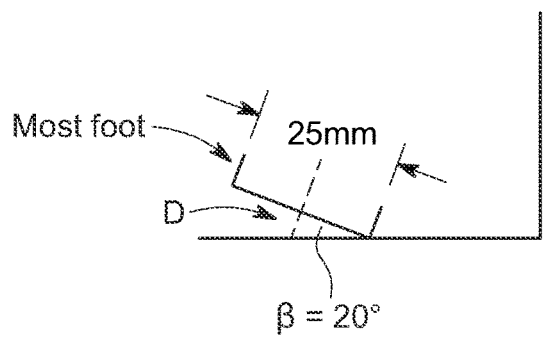
FIG. 7B is a diagram showing the geometry of the offset calculation for a screw the automated leg length selection and screw anchor embedment calculation control processes according to various embodiments of the invention.

When driving begins, the tip of the screw anchor is always aligned with the opening at the mast foot. This provides a fixed reference so that as the rotary driver travels down along the mast, a linear encoder or other sensor(s) can measure the distance traveled. Because, in most cases, there is some distance between the anchor and ground caused by the corner of the mast foot touching the ground, the controller calculates that distance based on the drive angle and any pitch offset. In the case of flat ground, the extra distance, labeled D in FIGS. 7A and 7B, is the product of half the width of the foot (assumed to be 25 mm here) and the tangent of the angle β which is 20-degrees absent any offset due to East-West slope. In this case, that equals 4.55 mm. So, the controller operates the rotary driver to drive the screw anchor into the ground, until the driver has been measured to move down the mast E (1070 mm) plus an additional 4.55 mm as well as an error tolerance as discussed above.

Figure 8A:
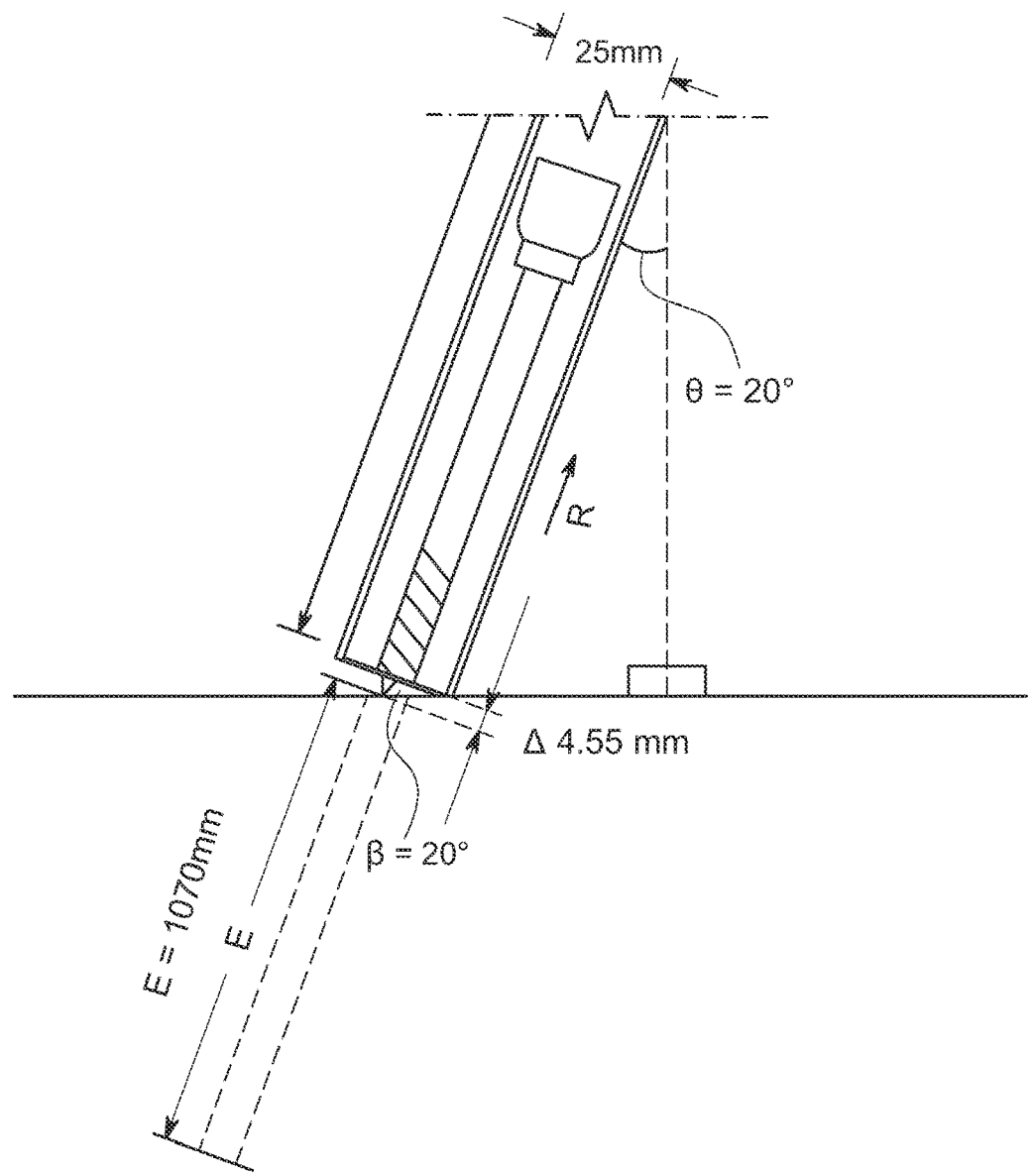
FIGS. 8A and 8B are diagrams illustrating the geometry underpinning the uplift correction control process according to various embodiments of the invention.
Figure 8B:
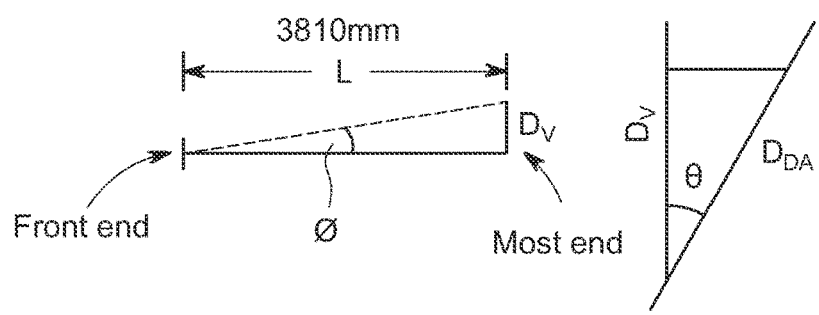

Once driving is complete, in various embodiments, the controller may confirm based on one or more inclinometer readings whether or not the machine and mast experienced any uplift during driving. As discussed above, resistance in the direction of the drive axis may result in the machine lifting up. This type of movement along the drive axis will not be detected by linear encoders tracking the movement of the rotary driver with respect to the mast because the mast itself is moving. Therefore, in various embodiments, to insure that the target depth is reached, it may be necessary for the machine to adjust E to compensate for such uplift. The precision is not necessarily driven by concerns over the foundation holding under load, but rather components fitting together so that the truss cap and bearing will be properly aligned with respect to others in the same row and within tolerances permitted by the tracker makers. FIGS. 8A and 8B illustrate the problem.

As the rotary driver travels down the mast, the controller monitors the extent of travel via one or more encoders and/or other sensors. In various embodiments, it will continue to control the rotary driver to rotate and the lower crowd motor to pull down on the rotary driver until it determines that the screw anchor has reached embedment depth E. However, because the controller is measuring movement of the rotary driver with respect to the mast, movement of the mast up or down will not be detected. Movement is most likely to occur along the driving vector as the machine is lifted up slightly in response to increased driving resistance. Therefore, while the driving operation is occurring and/or once the driving operation is complete or near complete, the controller may, based on the output of one or more inclinometers, determine that the machine has lifted and not returned to the pitch it was at when driving began. This indicates that there has been displacement along the drive axis. FIG. 8B shows one exemplary method of calculating this displacement, labeled $D_{DA}$ in the figure.

By measuring the angle of displacement from the mast end or rear of the machine to front end, the extent of vertical displacement $D_V$ can be calculated. If, for example, the distance from the drive axis of the mast to the rear pivot point is 3810 mm, and 0.5-degrees of vertical displacement is measured, this translates to 33.25 mm of $V_D$. The rear pivot point is the point along the ground to track interface that the machine tends to lift up about. This intermediate calculation is then usable to calculate displacement $D_{DA}$ along the drive axis by driving 33.25 by the Cosine of the drive angle (Cos (20)). This yields 35.38 mm of additional embedment. Therefore, the controller may control the machine (e.g., the lower crowd motor and rotary driver) to drive the screw anchor and additional 33.25 mm to reach the desired embedment depth E. Because this additional embedment is making up for embedment depth lost to displacement along the drive axis, it should not impact the selected leg length. In other words, the leg length originally selected by the controller should still work despite the additional compensatory embedment.

Figure 9:
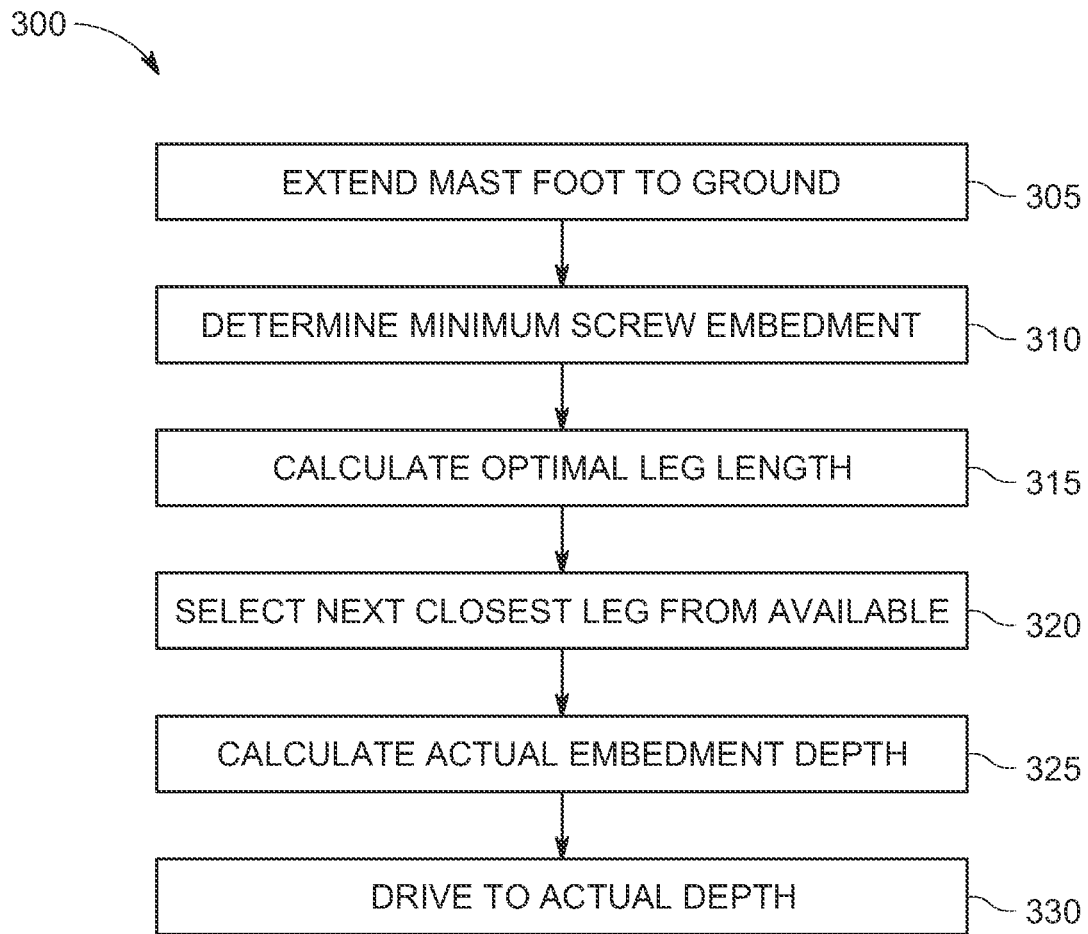
FIG. 9 is a flow chart detailing the steps of a method for determining upper leg length and actual embedment depth in with an automated screw anchor driving machine according to various embodiments of the invention.

Turning to FIG. 9, this figure shows flow chart 300 detailing the steps of a method for calculating upper leg length and embedment depth with an automated screw anchor driving machine according to various exemplary embodiments of the invention. The method begins after alignment has occurred in step 305 by extending the machine mast down until the mast foot contacts the ground. This may be accomplished with a mast slide or other suitable control. In some cases, this step may be performed manually by a machine operator. In others, the machine may perform this step automatically. As discussed above, this will give the controller a reference point for the mast relative to the ground. Next, in step 310, the minimum embedment depth is calculated. As discussed above, this may start with the minimum embedment depth for the array site and add to that any required adjustment for the starting position of the anchor relative to a known reference (e.g., how far down the mast had to move to reach the ground). as well as, if desired, adding additional distance to cover tolerance. Then, in step 315, the controller calculates the optimal leg length to achieve the minimum embedment depth. In various embodiments, and as shown in and discussed in the context of FIGS. 7A and B, this is accomplished by computing a distance from the specified work point to the insertion point and then subtracting from known machine offsets (i.e., distance from rotator center to the top of the upper leg) and the reveal length assuming the screw anchor is driven to the minimum embedment depth ($E_{MIN}$) for the site from that distance. Then, in step 320, this intermediate result is compared against onsite available leg lengths programmed into the machine and the next closest longer leg is selected. This information may be communicated to the operator via a user interface so that the operator can grab the specified leg from those available. Then, in step 325 the length of the specified leg is used to calculate the actual reveal which, in turn, is deducted from the specified screw anchor length to yield the actual embedment depth E that equals or exceeds the minimum embedment depth. Finally, in step 330, based on this information, the controller causes the machine to begin driving the screw anchor to achieve the actual embedment depth E by actuating the lower crowd motor and rotary driver.

Structured text code for accomplishing the method discussed above in the context of FIG. 9 is provided below in Table 1.

TABLE 1

IF SCREW_SIDE_LATCH = SCREW_CENTER THEN
 SCREW_EMBEDMENT := PLUMB_SCREW_EMBEDMENT;
 CROWD_ADVANCE_MIN := SCREW_EMBEDMENT;

TABLE 1-continued

```
ELSE
        SCREW_EMBEDMENT :=
pNVM1^.MINIMUM_EMBEDMENT_CM[SCREW_LENGTH_LATCH];
CROWD_ADVANCE_MIN := SCREW_EMBEDMENT +
pNVM1^.SCREW_TIP_TO_GROUND + DRIVE_DEPTH_TOLERANCE;
END_IF
CROWD_EMBED_ENDPOINT := pLOWER_CROWD^.FEEDBACK.POSITION_ENGR -
CROWD_ADVANCE_MIN;
IF CROWD_EMBED_ENDPOINT < LOWER_CROWD_MIN_END_POS THEN
        ERROR := TRUE;
        gotoErrorState(REASON := 'Cannot drive screw to minimum embedment, LC
range!');
        RETURN;
END_IF
IF SCREW_SIDE_LATCH = SCREW_CENTER THEN
        LEG_OVERDRIVE := 0;
        SCREW_REF_FROM_WP_ACTUAL := SCREW_EMBEDMENT +
pNVM1^.CHUCK_TO_TARGET;
        SCREW_END_POS := CROWD_EMBED_ENDPOINT;
        DRIVE_LEG_LENGTH := 0;
        DRIVE_SCREW_LENGTH := SCREW_LENGTH_CM;
        DRIVE_MINIMUM_EMBEDMENT := SCREW_EMBEDMENT;
        DRIVE_TARGET_EMBEDMENT := SCREW_EMBEDMENT;
        DRIVE_LEG_REVEAL := SCREW_LENGTH_CM - DRIVE_TARGET_EMBEDMENT;
ELSE
OPERATOR_MS_ADJUST := (MAST_SLIDE_AT_WP -
AXES[AXIS_MAST_SLIDE].FEEDBACK.POSITION_ENGR);
LC_W_REF_AT_WP := LOWER_CROWD_AT_WP + pNVM1^.CHUCK_TO_TARGET +
OPERATOR_MS_ADJUST;
        SCREW_REF_FROM_WP_EMBED := LC_W_REF_AT_WP -
CROWD_EMBED_ENDPOINT;
        IF WP_HEIGHT_LATCH = WP_LOW THEN
        SCREW_REF_FROM_WP_EMBED := SCREW_REF_FROM_WP_EMBED +
LOW_WP_ADJUST;
        END_IF
        LEG_LENGTH_EMBED := SCREW_REF_FROM_WP_EMBED -
            pNVM1^.SHORT_LEG_TOP_TO_WP + DRIVE_DEPTH_TOLERANCE;
FOUND := FALSE;
FOR INDEX := 1 TO LEG_LENGTHS_COUNT DO
IF pNVM2^.LEG_LENGTH_USED[INDEX] AND pNVM2^.LEG_LENGTHS_CM[INDEX] >
LEG_LENGTH_EMBED THEN
LEG_LENGTH_ACTUAL := pNVM2^.LEG_LENGTHS_CM[INDEX];
FOUND := TRUE;
EXIT;
END_IF
END_FOR;
IF NOT FOUND THEN
    ERROR := TRUE;
    gotoErrorState(REASON := 'Attempt to use a leg longer that what is available!');
    RETURN;
    END_IF
LEG_OVERDRIVE := (LEG_LENGTH_ACTUAL - LEG_LENGTH_EMBED);
SCREW_REF_FROM_WP_ACTUAL := SCREW_REF_FROM_WP_EMBED +
LEG_OVERDRIVE;
SCREW_END_POS := CROWD_EMBED_ENDPOINT - LEG_OVERDRIVE +
pNVM1^.SCREW_STOP_THRESHOLD;
DRIVE_LEG_LENGTH := LEG_LENGTH_ACTUAL;
DRIVE_SCREW_LENGTH := SCREW_LENGTH_CM;
DRIVE_MINIMUM_EMBEDMENT := SCREW_EMBEDMENT;
DRIVE_TARGET_EMBEDMENT := SCREW_EMBEDMENT + LEG_OVERDRIVE;
            DRIVE_LEG_REVEAL := SCREW_LENGTH_CM -
DRIVE_TARGET_EMBEDMENT;
END_IF
IF SCREW_END_POS < LOWER_CROWD_MIN_END_POS THEN
SCREW_END_POS := LOWER_CROWD_MIN_END_POS;
DRIVE_LEG_LENGTH := 0;
END_IF
DRIVE_DESIRED := SCREW_START_POS - SCREW_END_POS;
```

Figure 10:
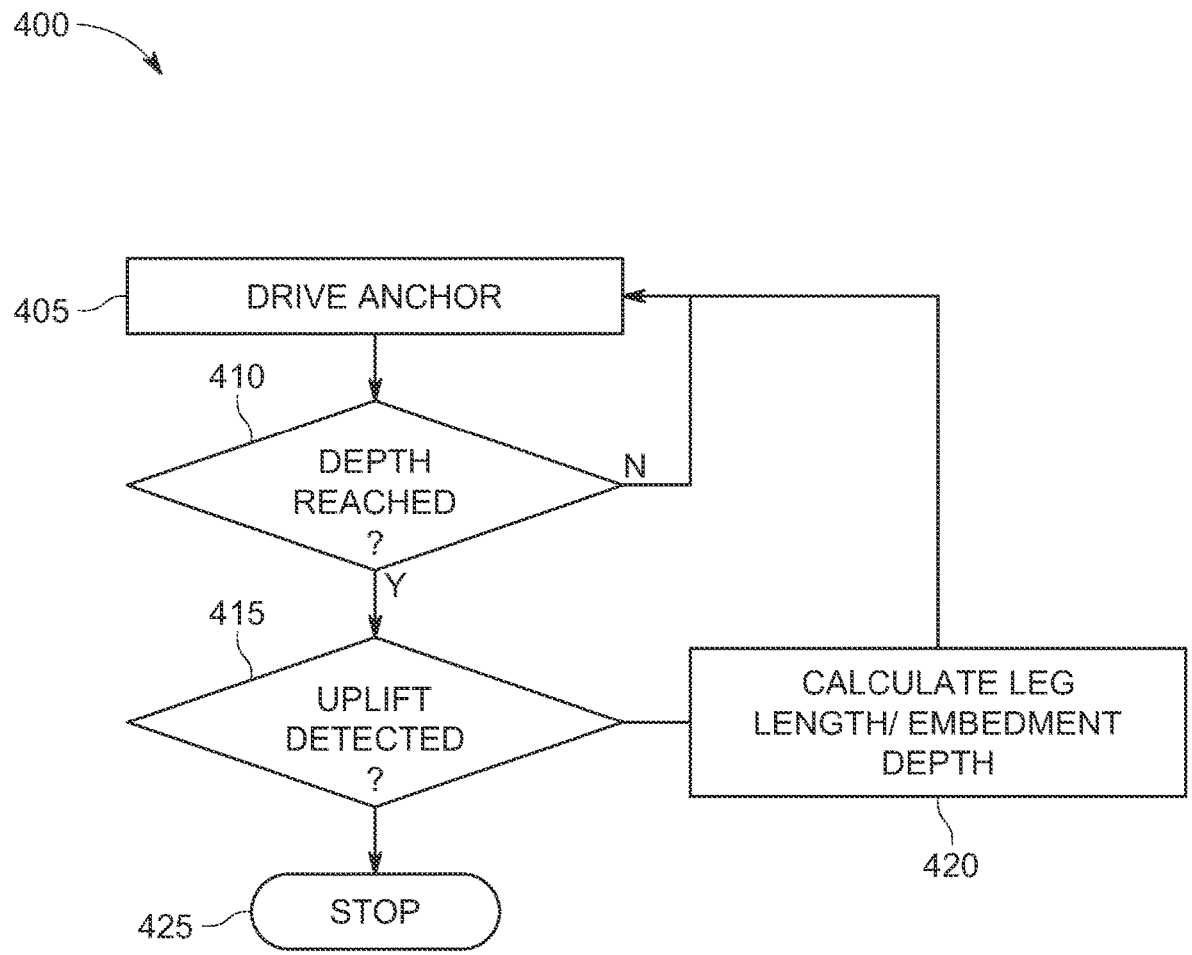
FIG. 10 is a flow chart detailing the steps of a method for uplift correction with an automated screw anchor driving machine according to various embodiments of the invention.

Turning now to FIG. 10, this figure shows flow chart 400 detailing the steps of a method for compensating for any displacement that occurs along the drive axis during a screw anchor driving operation according to various exemplary embodiments of the invention. The method begins in step 405 with the screw anchor driving operation. In various embodiment, during the driving operation, the controller monitors encoder information and in step 410 determines whether the desired embedment depth has been reached. If not, driving continues. Otherwise, if the desired embedment depth has been reached, processing proceeds to step 415 where the controller determines whether or not uplift occurred while driving based on information received from one or more inclinometers or other sensors during the driving operation. In various embodiments, if the pitch of the machine changes during the drive operation, this will impact machine's ability to reach the embedment depth. The controller could wrongly conclude that the actual embedment depth E was reached because it failed to detect that the entire mast raised up while driving. Therefore, in various embodiments, while the operation is underway or just after, the controller will determine whether or not uplift occurred. If not, the controller will correctly assume that the actual embedment depth E was reached, and operation stops in step 425. Otherwise, if uplift was detected, operation proceeds to step 420 where the controller selects a longer upper leg length and computes an additional distance to E+ to compensate for $T_{DA}$ and to drive the screw anchor the additional distance as shown and discussed on the context of FIGS. 8A and B. The amount of additional distance may be based on the extent of uplift. Alternatively, the amount of distance may be the incremental distance to one of the remaining available leg lengths. If so, the machine may provide notice to the operator that upper leg length has changed so that the correct leg is pulled, and operation returns to step 405 where driving continues to E+. In some cases, if this process continues iteratively and/or if the required additional embedment depth is greater than the additional length provided by the longest available upper leg, that a custom upper leg will have to be cut from a longer length of leg material available onsite. In such cases, the machine may indicate this to the operator along with the precise leg length.

Structured text code for accomplishing the method discussed above in the context of FIG. 10 is provided below in Table 2.

TABLE 2

Figure 11:
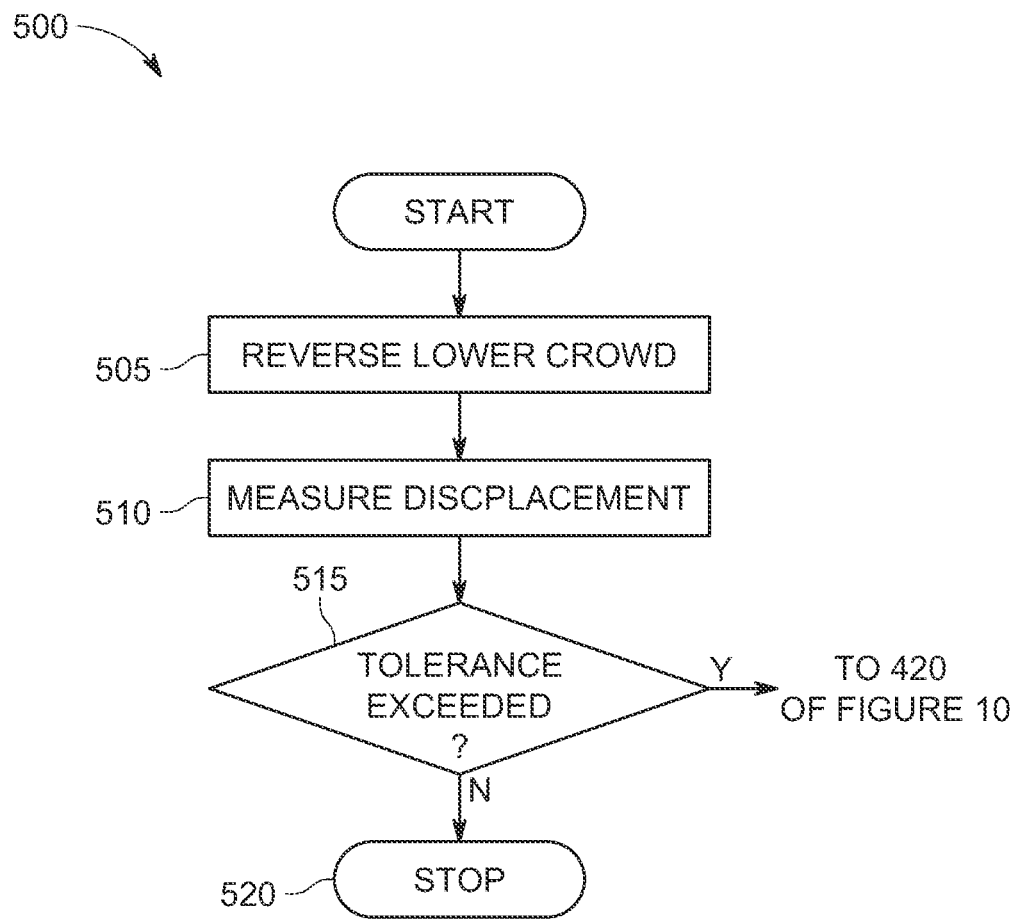
FIG. 11 is a flow chart detailing the steps of a method for validating the pull-out strength of a driven screw anchor with an automated screw anchor driving machine according to various embodiments of the invention.

SCREW_DRIVE_ERROR := (TAN (BASE_PITCH_END − BASE_PITCH_START) * BASE_PITCH_PIVOT_LEN)/COS(ROTATOR_SCREW_ANGLE);

One of the advantages of the machine and automated control system according to the various embodiments of the invention is the ability to validate the performance of each screw anchor in-situ at the time of driving. For example, after a screw anchor has been driven to the desired embedment depth, the existing equipment can be operated to quickly and accurately validate the screw anchor's ability to resist pull-out. To that end, FIG. 11 details the steps of method 500 for performing a post-driving pull test on a driven screw anchor with the machine and mast shown in FIGS. 4A and 5, in accordance with various embodiments. The method begins in step 505 when the driving operation is complete but while the rotary driver is still down toward the lower end of the mast and connected to the screw anchor. In various embodiments, the controller will actuate the lower crowd motor to power the drive train in the reverse direction with a fixed amount of force (e.g. 2,000 pounds) for a fixed period of time (e.g., 5 seconds). Then, in various embodiments, in step 510, the controller will monitor the position of the rotary driver and/or the carriage it is riding on relative to the mast via one or more encoders or other sensor(s) to measure any displacement along the drive axis. Next, in step 515, the controller will determine whether the measured displacement, if any, exceeds the allowable tolerances. As during driving, it may be necessary to also monitor one or more inclinometers so that motion of the rotary driver along the mast caused by the entire mast being pulled down is not interpreted by the controller as a false positive. If not, the controller will conclude that the screw anchor has been successfully driven and operation will proceed to step 520 where it stops so that the rotary driver may be retracted without the screw anchor so that the next one can be loaded. Otherwise, if the controller determines that the test resulted in a fail, operation may revert to step 420 of method 400 shown in FIG. 10, or an substantially equivalent process where a new upper leg length is selected and a new actual embedment depth calculated so that the machine may be controlled to drive the screw anchor to the new, deeper embedment depth.

The embodiments of the present invention are not to be limited in scope by the specific embodiments described herein. For example, although many of the embodiments disclosed herein have been described with reference to systems and methods for automated installation of foundation components for axial solar arrays, the principles herein are equally applicable to systems and methods for installing foundations for other structures. Indeed, various modifications of the embodiments of the present invention, in addition to those described herein, will be apparent to those of ordinary skill in the art from the foregoing description and accompanying drawings. Thus, such modifications are intended to fall within the scope of the following appended claims. Accordingly, the claims set forth below should be construed in view of the full breath and spirit of the embodiments of the present inventions as disclosed herein.

The invention claimed is:

1. A screw anchor driving machine comprising:
a mast attached to the machine, the mast comprising a screw anchor driving assembly comprising:
a first motor powering a drive train;
a rotary driver traveling along the mast via the drive train;
a tool driver traveling along the mast above the rotary driver and operable to operate a tool through the rotary driver; and
a second motor coupled to the tool driver for selectively moving the tool driver along the mast independent of the drive train;
a controller coupled to the first motor, the rotary driver, the tool driver, and the second motor to perform an automated screw anchor driving operation based on a control program stored in a memory of the controller; and
a plurality of sensors providing information to the controller during the automated screw anchor driving operation.

2. The machine according to claim 1, wherein the control program contains program code that causes the controller to calculate an upper leg length and an actual embedment depth based on a desired work point and a minimum embedment depth, and to drive the screw anchor substantially to the actual embedment depth with at least the first motor, the rotary driver and the tool driver, based in part on information received from the plurality of sensors during the driving operation.

3. The machine according to claim 2, wherein the control program contains program code that causes the controller to increase the actual embedment depth based on information received from at least one of the plurality of sensors during the driving operation.

4. The machine according to claim 2, wherein the control program contains program code that causes the controller to perform a pull test on the screw anchor with the first motor after substantially reaching the desired embedment depth.

5. The machine according to claim 2, wherein the control program contains program code that causes the controller to store information received from the plurality of sensors and a results of the pull test in association with a position of the screw anchor in the memory of the controller.

6. The machine according to claim 2, wherein if the controller determines that the screw anchor fails the pull test, the control program contains program code that causes the controller to select a longer upper leg from a list of available upper leg lengths based on the same work point and to calculate a revised actual embedment depth based on the longer upper leg.

7. The machine according to claim 6, wherein the control program contains program code that causes the controller to drive the screw anchor substantially to the revised actual embedment depth.

\* \* \* \* \*